United States Patent [19]

Drori

[11] Patent Number: 5,013,461
[45] Date of Patent: May 7, 1991

[54] REGENERATION METHOD OF FILTER DEVICE HAVING FILTER AID MATERIAL AND PISTON APPARATUS

[76] Inventor: Mordeki Drori, 89 Zahal Street, Kiron, Israel

[21] Appl. No.: 245,737

[22] Filed: Sep. 16, 1988

[30] Foreign Application Priority Data

Sep. 18, 1987 [IL] Israel ................................. 83950
Oct. 25, 1987 [IL] Israel ................................. 84274

[51] Int. Cl.[5] ................................................ C01D 37/02
[52] U.S. Cl. ............................ 210/777; 210/193; 210/412; 210/488
[58] Field of Search ............... 210/106, 193, 411, 412, 210/488, 777

[56] References Cited

U.S. PATENT DOCUMENTS

| R. 32,537 | 11/1987 | Drori | 210/108 |
|---|---|---|---|
| 26,709 | 11/1869 | Linden et al. | 210/500.1 |
| 32,537 | 11/1987 | Drori | 210/108 |
| 226,271 | 4/1880 | Blaisdell | 210/488 |
| 327,646 | 10/1885 | Bingham, Jr. | 210/283 |
| 428,307 | 5/1890 | Leland | 210/488 |
| 730,485 | 6/1903 | Simoneton | 210/488 |
| 836,306 | 11/1906 | Cunning | 137/489 |
| 913,636 | 2/1909 | Gardiner | 210/396 |
| 1,098,616 | 6/1914 | Creveling | 137/489 |
| 1,496,771 | 6/1924 | Cash | 210/238 |
| 1,581,998 | 4/1926 | Fulcher | 210/357 |
| 1,642,864 | 9/1927 | Williams | 210/488 |
| 1,643,299 | 9/1927 | Furness | 210/488 |
| 1,673,743 | 6/1928 | Fulcher et al. | 210/415 |
| 1,719,346 | 7/1929 | Thompson | 210/357 |
| 1,797,399 | 3/1931 | Boulade | 210/488 |
| 1,804,512 | 5/1931 | Pickard | 210/492 |
| 1,849,042 | 3/1932 | Pickard et al. | 210/186 |
| 1,852,873 | 4/1932 | Berger | 210/308 |
| 1,906,391 | 5/1933 | McKinley | 210/488 |
| 1,926,557 | 9/1933 | Perkins | 210/167 |
| 1,929,246 | 10/1933 | Hechenbleikner | 55/484 |
| 1,955,903 | 4/1934 | Cammen | 210/130 |
| 1,976,547 | 10/1934 | Dumas | 210/441 |
| 1,992,101 | 2/1935 | Stuart | 210/193 |
| 1,994,656 | 3/1935 | Liddell | 210/412 |
| 2,031,165 | 2/1936 | Johnson | 210/181 |
| 2,137,556 | 11/1938 | Young | 210/169 |
| 2,178,463 | 10/1939 | Bahnson | 55/272 |
| 2,305,351 | 12/1942 | Hellan | 210/167 |
| 2,330,945 | 10/1943 | Becker | 210/164 |
| 2,338,417 | 1/1944 | Forrest et al. | 210/412 |
| 2,338,418 | 1/1944 | Forrest et al. | 210/412 |
| 2,338,419 | 1/1944 | Forrest et al. | 210/412 |
| 2,365,525 | 12/1944 | Cox | 210/492 |
| 2,374,756 | 5/1945 | Kisch et al. | 210/232 |
| 2,387,364 | 10/1945 | Terry | 137/469 |

List continued on next page.

FOREIGN PATENT DOCUMENTS 16248 10/1928 Australia .
113021 5/1940 Australia .
126722 10/1945 Australia ............................ 210/492

(List continued on next page.)

Primary Examiner—W. Gary Jones
Assistant Examiner—Cynthia L. Nessler
Attorney, Agent, or Firm—Pearne, Gordon, McCoy & Granger

[57] ABSTRACT

A fluid filter comprising a housing, a filter element disposed in the housing and arranged to receive a flow of fluid to be filtered from an upstream side of the element to a downstream side thereof, a fluid inlet communicating with the interior of the housing and with the upstream side of the filter element, a fluid outlet communicating with the downstream side of the filter element, and piston apparatus operative in a regeneration mode for producing circulation of fluid generally simultaneously from the downstream side of the filter element to the upstream side thereof and from the upstream side of the filter element to the downstream side thereof, thereby dislodging and reorienting particulate matter engaging the filter element.

3 Claims, 15 Drawing Sheets

U.S. PATENT DOCUMENTS

| | | | |
|---|---|---|---|
| 2,422,735 | 6/1947 | LaGuardia | 210/117 |
| 2,455,486 | 12/1948 | Hicks | 210/169 |
| 2,495,095 | 1/1950 | Ewbank | 210/492 |
| 2,507,827 | 5/1950 | Stafford et al. | 210/500.1 |
| 2,508,602 | 5/1950 | Goetz | 210/500.1 |
| 2,519,506 | 8/1950 | Russell | 210/183 |
| 2,554,016 | 5/1951 | Czarnecki, Jr. et al. | 210/492 |
| 2,557,375 | 6/1951 | Dickenson | 210/167 |
| 2,575,995 | 11/1951 | Briggs et al. | 210/492 |
| 2,583,423 | 1/1952 | Hallinan | 210/185 |
| 2,608,952 | 9/1952 | Herbert | 119/159 |
| 2,609,832 | 9/1952 | Smith | 137/489 |
| 2,631,732 | 3/1953 | Volcelka | 210/492 |
| 2,654,440 | 10/1953 | Robinson | 210/492 |
| 2,665,813 | 1/1954 | Bollaert | 210/500.1 |
| 2,670,769 | 3/1954 | Erikson | 251/48 |
| 2,670,851 | 3/1954 | Curtis | 210/120 |
| 2,692,686 | 10/1954 | Fleck et al. | 210/179 |
| 2,696,306 | 11/1954 | Gomery | 210/500.1 |
| 2,702,637 | 2/1955 | Shepard | 210/492 |
| 2,757,802 | 8/1956 | Schmid | 210/169 |
| 2,768,751 | 10/1956 | Booth | 210/193 |
| 2,793,753 | 5/1957 | Webster | 210/153 |
| 2,847,126 | 8/1958 | Goodman | 210/411 |
| 2,855,106 | 10/1958 | English | 210/492 |
| 2,873,030 | 2/1959 | Ashton | 210/444 |
| 2,889,048 | 6/1959 | Nordin | 210/409 |
| 2,892,240 | 6/1959 | Frankenhoff | 210/500.1 |
| 2,907,466 | 10/1959 | Beddow | 210/457 |
| 2,920,690 | 1/1960 | Wright | 137/568 |
| 2,926,137 | 2/1960 | Calvert | 210/500.1 |
| 2,946,447 | 7/1960 | Weltz | 210/333 |
| 2,956,016 | 10/1960 | Leppla | 210/503 |
| 2,978,108 | 4/1961 | Strassheim | 210/346 |
| 3,005,556 | 10/1961 | Jensen | 210/488 |
| 3,018,791 | 1/1962 | Knox | 137/458 |
| 3,037,637 | 6/1962 | Bub | 210/487 |
| 3,048,276 | 8/1962 | Darnell | 210/304 |
| 3,061,102 | 10/1962 | Mayer | 210/412 |
| 3,105,042 | 9/1963 | Roosa | 210/444 |
| 3,111,963 | 11/1963 | Brockwell | 138/39 |
| 3,149,070 | 9/1964 | Nash | 210/169 |
| 3,151,071 | 9/1964 | Kasten | 210/488 |
| 3,195,730 | 7/1965 | Muller | 210/488 |
| 3,221,888 | 12/1965 | Muller | 210/412 |
| 3,233,741 | 2/1966 | Bell | 210/500.1 |
| 3,273,374 | 9/1966 | Annett | 210/488 |
| 3,278,040 | 10/1966 | Goldberg | 210/500.1 |
| 3,282,435 | 11/1966 | Goldberg | 210/500.1 |
| 3,322,281 | 5/1967 | Gulick | 210/134 |
| 3,323,963 | 6/1967 | Summers | 156/192 |
| 3,335,869 | 8/1967 | Hedges | 210/500.1 |
| 3,338,416 | 8/1967 | Barry | 210/297 |
| 3,355,021 | 11/1967 | Jones | 210/130 |
| 3,369,665 | 2/1968 | Paulson | 210/94 |
| 3,370,712 | 2/1968 | Smith et al. | 210/457 |
| 3,382,982 | 5/1968 | Stevens | 210/184 |
| 3,397,794 | 8/1968 | Toth et al. | 210/488 |
| 3,400,734 | 9/1968 | Rosenberg | 137/495 |
| 3,445,002 | 5/1969 | Muller | 210/488 |
| 3,448,862 | 6/1969 | Kudlaty | 210/489 |
| 3,460,557 | 8/1969 | Gallant | 137/82 |
| 3,473,668 | 10/1969 | Bunyard et al. | 210/344 |
| 3,493,113 | 2/1970 | Rosaen | 210/108 |
| 3,494,376 | 2/1970 | Doeringsfeld et al. | 137/87 |
| 3,503,511 | 3/1970 | Spitzberg | 210/232 |
| 3,511,374 | 5/1970 | Beal | 210/139 |
| 3,521,850 | 7/1970 | German | 251/28 |
| 3,529,726 | 9/1970 | Keenan | 210/232 |
| 3,561,602 | 2/1971 | Molitor | 210/488 |
| 3,574,509 | 4/1971 | Zentis | 210/107 |
| 3,622,003 | 11/1971 | Czech | 210/488 |
| 3,631,887 | 1/1972 | Schlechtriem et al. | 137/522 |
| 3,638,905 | 1/1972 | Ferris | 251/94 |
| 3,647,084 | 3/1972 | Martin | 210/488 |
| 3,648,843 | 3/1972 | Pearson | 210/488 |
| 3,666,107 | 5/1972 | Boggs et al. | 210/488 |
| 3,679,052 | 7/1972 | Asper | 210/777 |
| 3,717,252 | 2/1973 | Picard | 210/108 |
| 3,722,681 | 3/1973 | Boorujy | 210/108 |
| 3,722,851 | 3/1973 | Love | 251/54 |
| 3,788,593 | 1/1974 | Cohen | 251/28 |
| 3,789,990 | 2/1974 | Drori | 210/488 |
| 3,859,216 | 1/1975 | Sisson et al. | 210/440 |
| 3,882,025 | 5/1975 | Talley, Jr. | 210/354 |
| 3,890,232 | 6/1975 | Combest et al. | 210/223 |
| 3,957,636 | 5/1976 | Arvanitakis | 210/193 |
| 3,959,140 | 5/1976 | Legras | 210/107 |
| 3,994,810 | 11/1976 | Schaeffer | 210/108 |
| 4,026,806 | 5/1977 | Drori | 210/405 |
| 4,039,457 | 8/1977 | Schacht et al. | 210/493.4 |
| 4,042,504 | 8/1977 | Drori | 210/108 |
| 4,045,345 | 8/1977 | Drori | 210/108 |
| 4,048,067 | 9/1977 | Cheng | 210/739 |
| 4,060,483 | 11/1977 | Barzuza | 210/414 |
| 4,062,774 | 12/1977 | Hinojosa | 210/444 |
| 4,082,057 | 4/1978 | Hayes | 239/265 |
| 4,115,274 | 9/1978 | Boddeker et al. | 210/488 |

(List continued on next page.)

U.S. PATENT DOCUMENTS

| | | | |
|---|---|---|---|
| 4,156,651 | 5/1979 | Mehoudar | 210/412 |
| 4,207,181 | 6/1980 | Drori | 210/409 |
| 4,235,723 | 11/1980 | Bartlett, Jr. | 210/497.1 |
| 4,251,374 | 2/1981 | Cunningham | 210/232 |
| 4,267,042 | 5/1981 | Hofmann | 210/444 |
| 4,267,045 | 5/1981 | Hoof | 210/488 |
| 4,271,018 | 6/1981 | Drori | 210/108 |
| 4,278,540 | 7/1981 | Drori | 210/108 |
| 4,284,500 | 8/1981 | Keck | 210/411 |
| 4,288,330 | 9/1981 | Strub | 210/777 |
| 4,295,963 | 10/1981 | Drori | 210/108 |
| 4,297,209 | 10/1981 | DeVisser et al. | 210/108 |
| 4,299,699 | 11/1981 | Boogay | 210/143 |
| 4,308,142 | 12/1981 | Braukmann et al. | 210/411 |
| 4,402,829 | 9/1983 | Cordua | 210/488 |
| 4,410,430 | 10/1983 | Hagler, Jr. | 210/488 |
| 4,430,232 | 2/1984 | Doucet | 210/488 |
| 4,435,287 | 3/1984 | Sumimoto | 210/232 |
| 4,468,319 | 8/1984 | Laakso | 210/456 |
| 4,481,111 | 11/1984 | Christophe et al. | 210/405 |
| 4,517,089 | 5/1985 | Arnaud | 210/488 |
| 4,552,655 | 11/1985 | Granot | 210/488 |
| 4,552,662 | 11/1985 | Webster et al. | 210/444 |
| 4,572,784 | 2/1986 | Drori | 210/451 |
| 4,592,838 | 6/1986 | Christophe et al. | 210/444 |
| 4,624,785 | 11/1986 | Drori | 216/488 |
| 4,632,757 | 12/1986 | Rosenberg | 210/411 |
| 4,642,182 | 2/1987 | Drori | 210/488 |
| 4,654,143 | 3/1987 | Drori | 210/488 |
| 4,655,910 | 4/1987 | Tabor | 210/107 |
| 4,655,911 | 4/1987 | Tabor | 210/107 |
| 4,683,060 | 7/1987 | Drori | 210/488 |
| 4,707,258 | 11/1987 | Drori | 210/427 |
| 4,744,901 | 5/1988 | Drori | 210/488 |
| 4,751,000 | 6/1988 | Drori | 210/488 |
| 4,753,731 | 6/1988 | Drori | 210/488 |
| 4,762,615 | 8/1988 | Drori | 210/488 |
| 4,824,564 | 4/1989 | Edwards et al. | 210/232 |

FOREIGN PATENT DOCUMENTS

| | | | |
|---|---|---|---|
| 156721 | 8/1952 | Australia | |
| 156599 | 11/1952 | Australia | 210/492 |
| 549633 | 12/1957 | Canada | 210/492 |
| 586111 | 11/1959 | Canada | 210/492 |
| 0057670 | 8/1982 | European Pat. Off. | |
| 0177434 | 4/1986 | European Pat. Off. | |
| 0267866 | 5/1988 | European Pat. Off. | |
| 0284729 | 10/1988 | European Pat. Off. | |
| 846245 | 8/1952 | Fed. Rep. of Germany | |
| 1007743 | 5/1957 | Fed. Rep. of Germany | |
| 1213823 | 4/1966 | Fed. Rep. of Germany | |
| 1289827 | 2/1967 | Fed. Rep. of Germany | |
| 1461491 | 2/1969 | Fed. Rep. of Germany | |
| 1909129 | 9/1970 | Fed. Rep. of Germany | |
| 2054291 | 5/1971 | Fed. Rep. of Germany | |
| 1436277 | 1/1972 | Fed. Rep. of Germany | |
| 1536796 | 11/1972 | Fed. Rep. of Germany | |
| 2161703 | 6/1973 | Fed. Rep. of Germany | |
| 2453445 | 5/1976 | Fed. Rep. of Germany | |
| 2517635 | 11/1976 | Fed. Rep. of Germany | |
| 2629848 | 1/1977 | Fed. Rep. of Germany | |
| 2616915 | 11/1977 | Fed. Rep. of Germany | |
| 1536766 | 1/1979 | Fed. Rep. of Germany | |
| 3044843 | 9/1981 | Fed. Rep. of Germany | |
| 2629151 | 10/1982 | Fed. Rep. of Germany | |
| 3247440 | 7/1984 | Fed. Rep. of Germany | |
| 899337 | 5/1945 | France | |
| 1157258 | 5/1958 | France | |
| 1543176 | 10/1968 | France | |
| 38236 | 11/1971 | Israel | |
| 40046 | 8/1972 | Israel | |
| 49875 | 6/1976 | Israel | |
| 68288 | 4/1983 | Israel | |
| 68935 | 6/1983 | Israel | |
| 69679 | 9/1983 | Israel | |
| 73164 | 10/1984 | Israel | |
| 73165 | 10/1984 | Israel | |
| 75110 | 5/1985 | Israel | |
| 75822 | 7/1985 | Israel | |
| 77317 | 12/1985 | Israel | |
| 473331 | of 1952 | Italy | |
| 442936 | of 1964 | Japan | 210/488 |
| 600600 | 11/1928 | United Kingdom | |
| 563832 | 8/1944 | United Kingdom | |
| 570960 | 7/1945 | United Kingdom | |
| 687967 | 2/1953 | United Kingdom | |

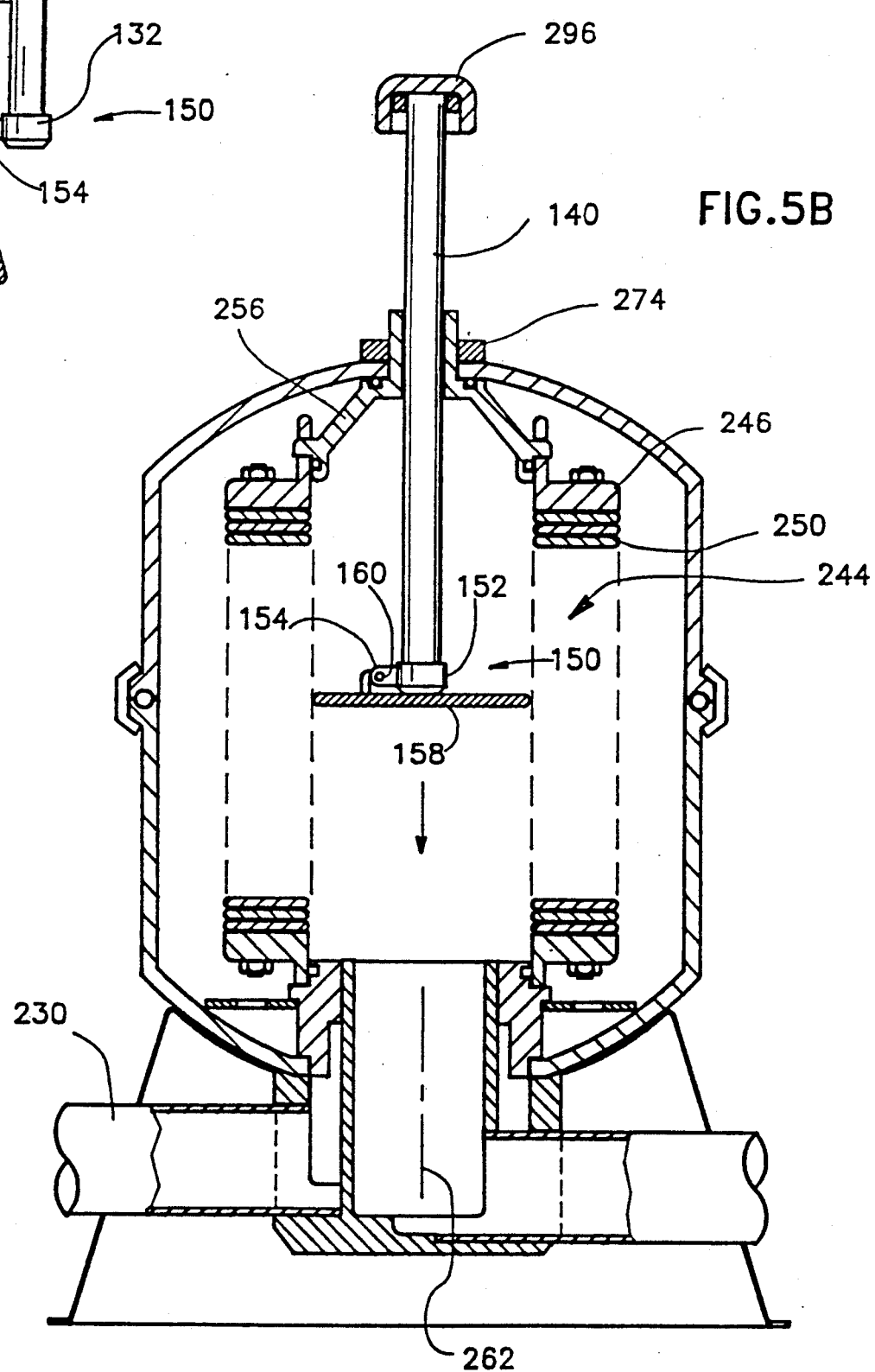

5,013,461

REGENERATION METHOD OF FILTER DEVICE HAVING FILTER AID MATERIAL AND PISTON APPARATUS

FIELD OF THE INVENTION

The present invention relates to fluid filters and more particularly to fluid filters employing a filter aid, such as diatomaceous earth or activated carbon associated with a filter element.

BACKGROUND OF THE INVENTION

Various types of filters are known in the marketplace and in the patent literature.

Multiple-disk type filters generally include a housing in which the filter element within the housing is in the form of a stack of like, centrally-apertured, filter disks of substantially uniform thickness along their widths and having grooved side faces defining filtering channels between the adjacent disks in the stack. In some applications of such filters the outer face of the stack of filter disks constitutes the upstream side of the filter, in which case the fluid being filtered passes from the outer face to the inner face of the stack. In other applications of such filters, the inner face of the stack constitutes the upstream side of the filter, in which case the fluid being filtered passes from the inner to the outer face through the filter stack.

Multiple-disk type filters have a number of advantages over other known types of filters for example, the cylindrical-screen type filter. The multiple-disk filter has a larger capacity for removing and retaining dirt particles, since these may be retained also between the side faces of the disks in addition to being retained on the upstream surface as in the cylindrical-screen type filter. Another advantage in the multiple-disk filter is that it is not as easily ruptured as the screen type and therefore there is less danger that because of a malfunction, unfiltered water may pass through and clog sprinklers or other devices downstream of the filter. The latter advantage is particularly important in self-cleaning filters wherein the upstream face of the filter is cleaned by a cleaning nozzle which, in the case of a screen-type filter, may rupture the screen by particles becoming wedged between the cleaning nozzle and the filter screen.

Back-flushable filters of various types are well known in the art for a great variety of applications. A particularly successful type of backflushable filter employing filter disks is described and claimed in the following patents of applicant: U.S. Pat. Nos. 4,026,806; 4,042,504; 4,045,345; 4,271,018; 4,295,963.

SUMMARY OF THE INVENTION

The present invention seeks to provide a fluid filter incorporating a filter aid material having enhanced regeneration features as compared with the prior art. The fluid filter of the present invention enables filter aid material to be regenerated a multiplicity of times and also enables accumulated particulate matter to be usefully employed as part of an intermediate filtering layer together with the filter aid material. The fluid filter of the present invention also enables fine particulate material to be removed during regeneration without loss of the filter aid material.

There is thus provided in accordance with a preferred embodiment of the present invention a fluid filter comprising a housing, a filter element disposed in the housing and arranged to receive a flow of fluid to be filtered from an upstream side of the element to a downstream side thereof, a fluid inlet communicating with the interior of the housing and with the upstream side of the filter element, a fluid outlet communicating with the downstream side of the filter element, and piston apparatus operative in a reqeneration mode for producing circulation of fluid generally simultaneously from the downstream side of the filter element to the upstream side thereof and from the upstream side of the filter element to the downstream side thereof, thereby dislodging and reorienting particulate matter engaging the filter element.

In accordance with a preferred embodiment of the invention, filter aid material is associated with the filter element and forms part of the particulate matter which is dislodged and reoriented, whereby the filter aid material is effectively regenerated. In accordance with this preferred embodiment of the invention, there is also provided apparatus operative in a regeneration mode for draining fine particulate matter from the filter without removing filter aid material therefrom.

There is also provided in accordance with a preferred embodiment of the present invention a fluid filter comprising a housing, a filter element disposed in the housing and arranged to receive a flow of fluid to be filtered from an upstream side of the element to a downstream side thereof, a fluid inlet communicating with the interior of the housing and with the upstream side of the filter element, a fluid outlet communicating with the downstream side of the filter element filter aid material associated with the upstream side of the filter element and apparatus operative in a regeneration mode for draining fine particulate matter from the filter without removing filter aid material therefrom.

Additionally in accordance with the present invention, the apparatus for dislodging and reorienting is operative to cause a physical shock to be applied to the filter element.

Additionally in accordance with a preferred embodiment of the present invention, the apparatus for dislodging and reorienting comprises a manually operable piston assembly.

Additionally in accordance with a preferred embodiment of the present invention the filter element comprises a stack of filter disks, each having a hollow center arranged such that the hollow center of each disk is aligned along a longitudinal axis to define a central bore surrounded by the downstream surface of the filter element.

In the foregoing embodiment, the apparatus for dislodging and reorienting comprises a manually operable piston assembly which may be manually displaced along the longitudinal axis in order to force liquid in the central bore in a backward flow from the downstream side to the upstream side of the filter element at locatIons downstream of the piston with respect to its axial movement and to force liquid from the upstream side of the filter element to the downstream side thereof at locations upstream of the piston with respect to its axial movement.

In accordance with a preferred embodiment of the invention, the piston is a unidirectional piston.

Additionally in accordance with the present invention apparatus is provided for maintaining liquid in the central bore up to at least a given height. In accordance with one embodiment of the invention, the apparatus for maintaining comprises a pressure responsive valve associated with the outlet, and which is operative to close in the absence of a threshold pressure.

Further in accordance with an embodiment of the present invention fluid distributor apparatus is associated with the fluid inlet for distributing fluid entering at the fluid inlet about the interior of the housing in communication with the upstream side of the filter element.

There is also provided in accordance with a preferred embodiment of the present invention for use with a fluid filter comprising a housing, a filter element disposed in the housing and arranged to receive a flow of fluid to be filtered from an upstream side of the element to a downstream side thereof, a fluid inlet communicating with the interior of the housing and with the upstream side of the filter element, a fluid outlet communicating with the downstream side of the filter element, and piston apparatus disposed in association with the downstream side of the filter element, a regeneration method comprising the step of operating the piston for producing circulation of fluid generally simultaneously from the downstream side of the filter element to the upstream side thereof and from the upstream side of the filter element to the downstream side thereof, thereby dislodging and reorienting particulate matter engaging the filter element.

Additionally in accordance with a preferred embodiment of the present invention and wherein filter aid material is associated with the filter element and forms part of the particulate matter which is dislodged and reoriented, the regeneration method also comprises the step of draining fine particulate matter from the filter without removing filter aid material therefrom.

There is also provided in accordance with a preferred embodiment of the present invention for use with a fluid filter comprising a housing, a filter element disposed in the housing and arranged to receive a flow of fluid to be filtered from an upstream side of the element to a downstream side thereof, a fluid inlet communicating with the interior of the housing and with the upstream side of the filter element, a fluid outlet communicating with the downstream side of the filter element, and filter aid material associated with the upstream side of the filter element a regeneration method comprising the step of draining fine particulate matter from the filter without removing filter aid material therefrom.

There is also provided in accordance with a preferred embodiment of the present invention a fluid filter comprising a housing a filter element disposed in the housing and arranged to receive a flow of fluid to be filtered from an upstream side of the element to a downstream side thereof, a fluid inlet disposed at the bottom of the housing, a fluid outlet in communication with the downstream side of the filter element, and apparatus for causing disengagement of filter aid material associated with said upstream side of said filter element so as to enable regeneration of said filter aid material.

Additionally in accordance with a preferred embodiment of the invention the apparatus for causing disengagement comprises means for producing rotation of the filter element.

Further in accordance with a preferred embodiment of the invention, the apparatus for causing disengagement comprises means for impacting said filter element.

Additionally in accordance with a preferred embodiment of the invention, the apparatus for causing disengagement comprises means for forcing fluid from the downstream side through the filter element to the upstream side.

Further in accordance with an embodiment of the invention, the means for forcing fluid comprises a selectably orientable piston assembly.

Additionally in accordance with a preferred embodiment of the invention, the selectably orientable piston assembly comprises a hinged, foldable piston.

According to an alternative embodiment of the invention, the selectably orientable piston assembly comprises a pivotable piston.

Additionally in accordance with a preferred embodiment of the invention, there is also provided a pressure responsive valve associated with said fluid outlet.

BRIEF DESCRIPTION OF THE DRAWINGS

The present invention will be understood and appreciated more fully from the following detailed description, taken in conjunction with the drawings in which:

FIG. 5B is a side sectional illustration of a fluid filter similar to that of FIGS. 4A, 4B, and 5A but having a different piston structure:

FIG. 5C is a side view illustration of the piston structure of FIG. 5B in an alternative operative orientation:

DETAILED DESCRIPTION OF PREFERRED EMBODIMENTS

Figure 1B:
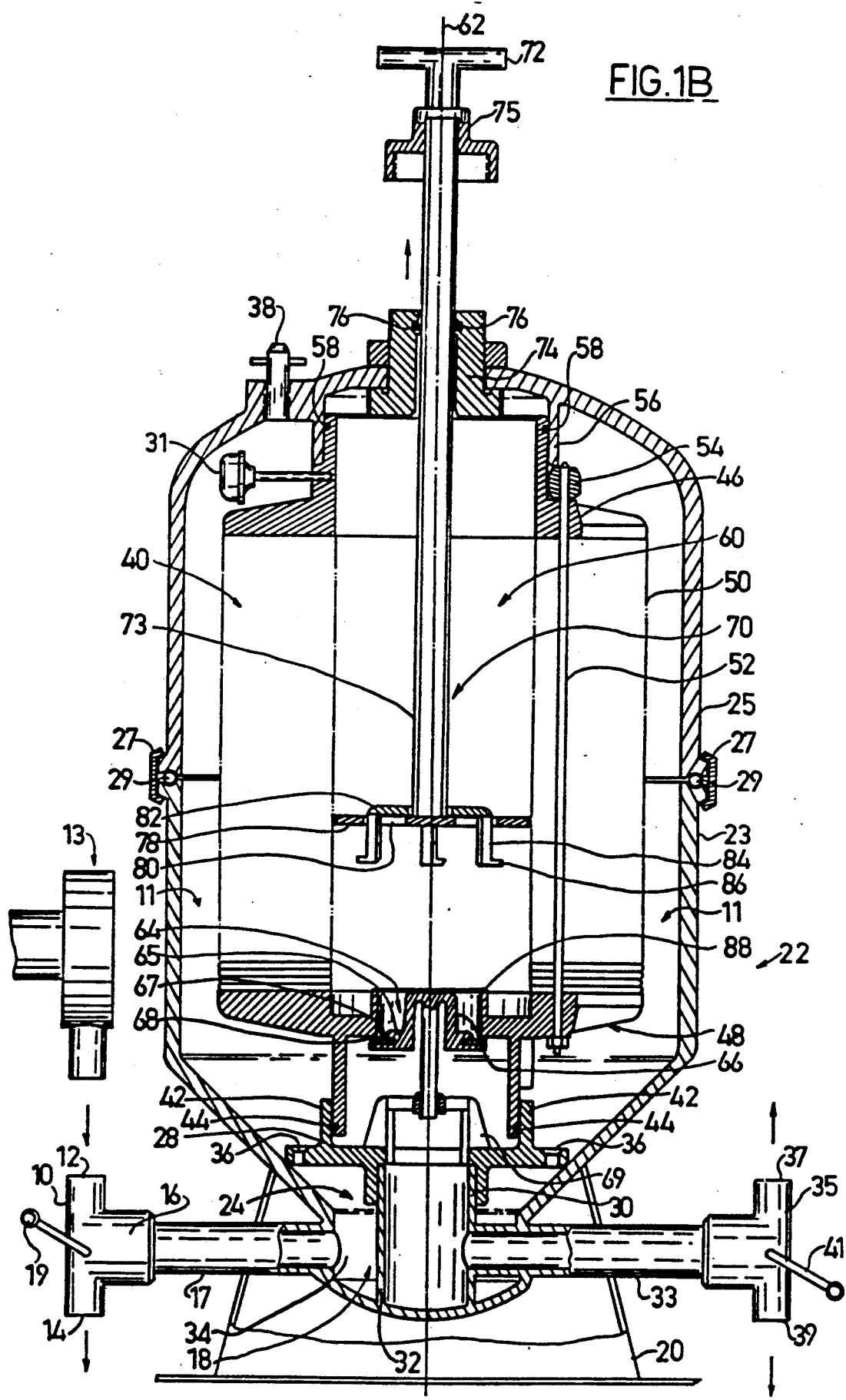
FIG. 1B is a side sectional illustration of the fluid filter of FIG. 1A in a second operative orientation characteristic of regeneration operation.
Figure 1A:
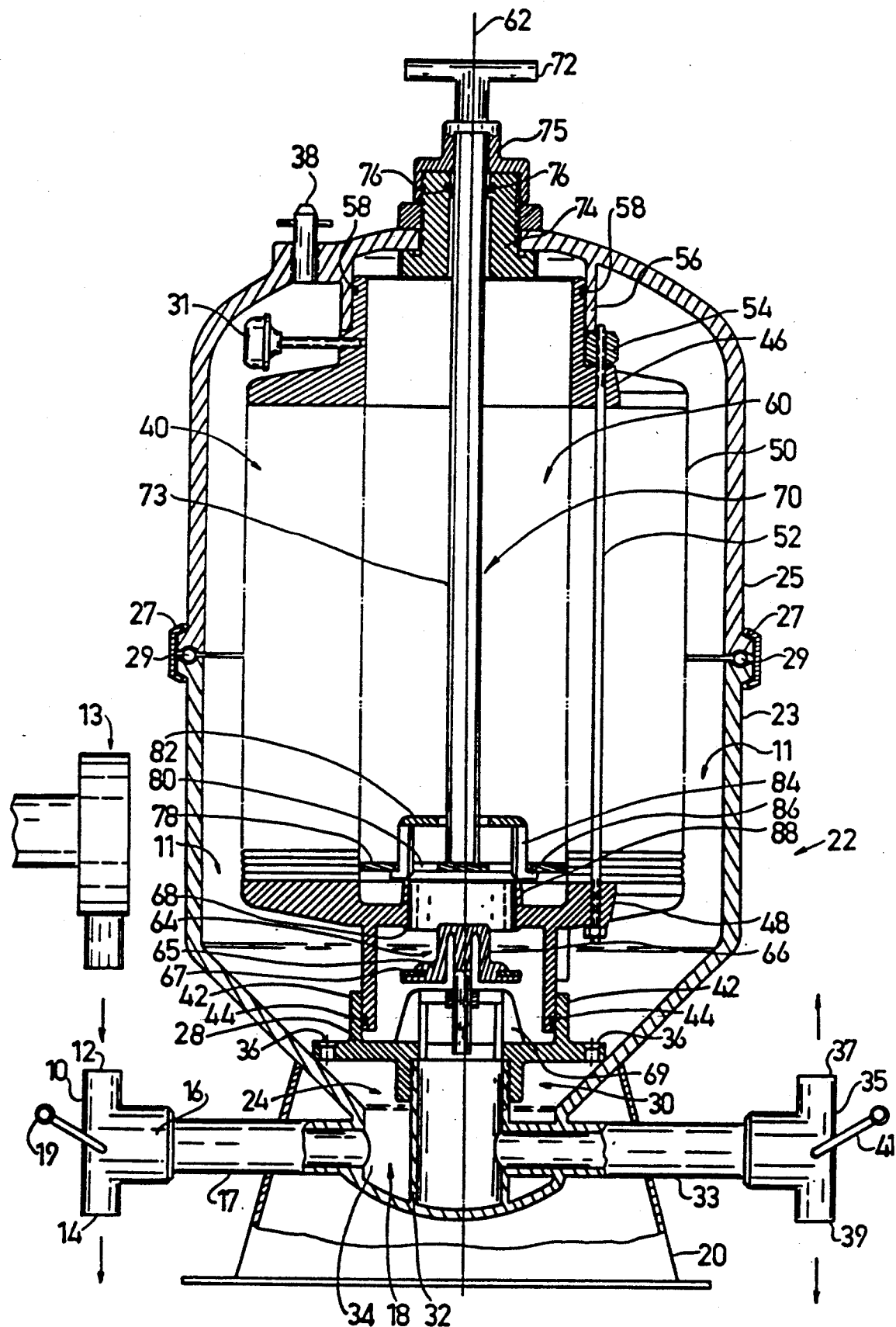
FIG. 1A is a side sectional illustration of a fluid filter constructed and operative in accordance with a preferred embodiment of the present invention and including a unidirectional piston in a first operative orientation characteristic of normal filtering operation.

Reference is now made to FIGS. 1A and 1B, which illustrate a fluid filter constructed and operative in accordance with a preferred embodiment of the present invention and including a conventional three way valve 10 having a first port 12 connected to a pressurized supply of fluid, such as water, to be filtered, as from a pump 13. Valve 10 also comprises a second port 14 connected to a drain and a third port 16 connected via an inlet pipe 17 to an inlet and outlet assembly 18. A handle 19 governs the operation of valve 10.

As seen in FIGS. 1A and 1B, the filter comprises a support base 20 which supports a filter housing 22 which is either configured to define or is associated with a manifold 24. Filter housing 22 is formed of a bottom part 23 and a top part 25 which are joined by an external sealing ring 27 and associated O-ring 29. An automatic air relief valve assembly 31 is associated with the top part 25 as is a conventional manually operated air relief assembly 38.

A threaded distributor member 28 is theadably mounted onto manifold 24 and engages external threadings 30 formed onto a central hollow shaft portion 32 of manifold 24.

Inlet pipe 17 and an outlet pipe 33 are each fixedly disposed in operative association with the manifold. The inlet pipe 17 communicates with an annular conduit 34 which surrounds shaft portion 32.

Outlet pipe 33 is coupled to a three way valve 35 including a port 37 connected to a filtered fluid outlet and a port 39 connected to a backflush drain A handle 41 governs the connections between the various ports and outlet pipe 33.

The annular outlet of conduit 34 communicates via passages 36 defined in a planar portion of distributor member 28. Passages 36 are generally evenly azimuthally distributed thereon, so as to permit exit of fluid to the upstream volume 11 defined interior of the filter housing 22 in a distributed manner over the entire 360 degrees of azimuth defined thereby.

A filter element 40, such as a disk filter element of the type described in U.S. Pat. application Ser. No. 07/150,246, filed Jan. 29, 1988, with reference to FIGS. 1-9A of that application, the disclosure of which is incorporated herein by reference, is seated on and supported by a support shoulder 42 defined by distributor member 28 and sealed with respect thereto by a sealing ring 44.

According to a preferred embodiment of the invention, filter aid material is associated with the upstream surface of the filter element 40. The filter aid material may be diatomaceous earth, activated carbon or any other suitable filter aid material in any form, such as a filter cake.

Filter element 40 is defined by top and bottom securing elements 46 and 48, which lie at respective top and bottom ends of a stack 50 of filter disks. The filter element 40 is held together tightly by a plurality of axial bolts 52 which are secured by suitable nuts 54 adjacent respective top and bottom securing elements. Filter disks are preferably of the type described in U.S. Pat. application No. 07/150,246, filed Jan. 29, 1988, with reference to FIGS. 1-9A of that application, the disclosure of which is incorporated herein by reference.

Bottom securing element 48 is seated onto shoulder 42, while top securing element 46 sealingly engages a cylindrical positioning protrusion 56 formed onto top part 25, via an O-ring 58.

Filter element 40 is formed with a hollow axial bore 60 which extends along a longitudinal axis 62 and is surrounded by the downstream surface of the filter element. The interior of the hollow shaft portion 32 communicates with the downstream side of the filter element via a liquid level maintenance valve 64 which is urged by a spring 66 to seat against a valve seat 68 defined by bottom securing element 48.

The spring 66 is selected such that the valve is unseated, as shown in FIG. 1A. during normal filtering operation and also at other times in which the pressure across valve 64 exceeds that produced by water filling the interior of housing 22.

Valve 64 comprises a valve body 65 and associated sealing ring 67 for engagement with valve seat 68. Spring 66 is seated between valve body 65 and a spring support 69, which is apertured to permit unfettered fluid flow therepast.

According to a preferred embodiment of the present invention, a manually operable unidirectional piston assembly 70 is provided and comprises a handle 72 coupled to a connecting rod 73 which extends along longitudinal axis 62 in axially slidable sealing engagement with a handle mounting collar 74 via an O-ring 76. A threaded retaining nut 75, which may be fixedly mounted onto rod 73, is operative to selectably fix handle 72 in a fully seated position as shown in FIG. 1A.

Connecting rod 73 terminates in an apertured piston plate 78 having an outer diameter which is equal or nearly equal to the diameter of bore 60. Apertures 80 are formed in plate 78 and are sufficiently large to permit unfettered flow of filtered water therethrough during normal filter operation, when connecting rod 73 is fully seated as shown in FIG. 1A.

Associated with piston plate 7B is a piston check valve element 82, which comprises an annular disk which is slidably mounted onto connecting rod 73 and is of dimensions such that when it is superimposed on plate 78 it substantially covers the apertures 80. Piston check valve element 82 is slidably mounted with respect to plate 78 by a plurality of depending leg elements 84 which are formed with outward protrusions 86 to prevent disengagement of the element 82 from plate 78.

It is appreciated that when the connecting rod 73 is fully seated in bore 60, for normal filtering operation as shown in FIG. 1A, protrusions 86 engage a shoulder 88 associated with bottom securing element 48, such that the annular disk part of element 82 is axially spaced from the plate 78 with the result that the apertures 80 are not blocked and substantially unfettered fluid flow can take place therethrough.

When, however, as shown in FIG. 1B, normal filter operation is terminated as by termination of the operation of pump 13 the pressure responsive check valve 64 is closed, thus retaining the water in the interior of filter housing 22.

If it is desired to regenerate the filter aid material the retaining nut 75 is unthreaded and the handle 72 is extended towards a fully raised orientation, such that the unidirectional piston assembly 70 is being moved upward against the body of water retained in bore 60 and the piston check valve element 82 lies in sealing engagement with plate 78, thus generally closing apertures 80.

In such an orientation plate 78 and element 82 act as a piston, forcing water located downstream of the piston (above the piston in FIG. 1B) through the filter element from the downstream side to the upstream side. This flow, due to the fact that the interior of the filter housing 22 is effectively sealed, causes a counter flow of water from the upstream surface in through the filter element to the bore 60 at locations upstream of the piston plate 78 (below the piston in FIG. 1B).

The operation of the apparatus shown in FIGS. 1A and 1B will now be summarized. During normal filtering operation, in the operative arrangement shown in FIG. 1A, a fluid, such as water, pressurized by a pump 13, enters through port 12 of three way valve 10 and passes through inlet pipe 17. At this time port 14 of valve 10 is closed.

The water flows into manifold 24 and flows upwardly through annular conduit 34 and passages 36 defined by distributor member 28 and enters upstream volume 11. The water to be filtered then passes through the filter element 40 on the upstream side of which is provided a filter aid, such as diatomaceous earth or activated carbon, normally in the form of a filter cake onto which particulate matter filtered out of the water is collected.

The filtered water passes out through the downstream side of the filter element 40 into hollow core 60 and passes through the spaces defined both by the clearance between connecting rod 73 and the disk portion of element 82 as well as between legs 84. It then passes through apertures 80 in plate 78 and through the opening which is defined by valve seat 68 when the valve body 65 is not seated thereon.

The filtered water then passes around the valve body 65 and through the spaces defined in element 69 to the interior of shaft portion 32 and out through outlet pipe 33, valve 35 and port 37.

The above described operation is characteristic of normal filtering and the water flows are indicated by the arrows in the drawing. In this operation, particulate material is filtered out of the water and collects on the filter cake at the upstream side of the filter element 40.

In order to regenerate the filter aid material of the filter cake to extend its useful lifetime and also to extend the filtering efficiency of the filter, the supply of pressurized water at inlet 12 may be terminated from time to time, as by termination of the operation of pump 13.

Upon termination of the supply of pressurized water at inlet 12 and the consequent pressure drop at valve 64, the valve body 65 seats on valve seat 68, and thus seals the interior of bore 60 from the outlet. In this way, valve 64 maintains the volume interior of filter housing 22 full of water.

Referring now to FIG. 1B, it is seen that handle 72 is raised, after unthreading of securing nut 75 from handle mounting collar 74. Upwards movement of the handle 72 forces element 82 into aperture closing engagement with plate 78, thereby defining a piston which operates to force the water in bore 60 upwardly. This movement forces water lying above the piston to move from the downstream side of filter element 40 through the filter element to the upstream side thereof and into the upstream volume 11, in a backflow direction. This causes the filter cake to fall out of engagement with the upstream surface of filter element 40 to the bottom of the interior of filter housing 22.

The negative pressure in that portion of bore 60 lying below the piston causes excess water to pass back through the filter element from the upstream side to the downstream side in the region lying below the piston. The piston may be raised and lowered a few times after which the handle 72 is returned to its fully seated position as shown in FIG. 1A and the securing nut 75 is threaded onto handle mounting collar 74.

When the handle 72 is fully seated, apertures 80 are opened due to the relative disengagement of element 82 from plate 78 and water is free to pass therepast. The handle 41 of valve 35 is moved so as to connect the outlet pipe 33 to the drain port 39 and to seal outlet port 37. The supply of pressurized water to the filter is then resumed, causing the filter cake material collected at the bottom of the upstream volume to rise and once again engage the upstream surface of the filter element 40.

The maintenance valve 64 is opened, permitting drainage of water from bore 60. At this stage, the filter cake is not yet fully operationally engaged with the upstream surface of the filter element 40 and fine particulate matter can pass through the filter element 40. For about 30 seconds the water carrying this fine particulate matter is permitted to flow through the drain.

After this period of time, the filter cake is properly engaged with the upstream surface, so as to prevent further passage of fine particulate matter through the filter element and handle 41 is moved so as to close the drain port 39 and to open the outlet port 37.

In the operation described above, the following is accomplished:

regeneration of the filter cake material, i.e. filter aid such as diatomaceous earth;

removal of part of the fine particulate matter to the drain without removal of the filter aid material;

prevention of passage of the fine particulate matter to the filtered water outlet;

integration of relatively large particulate matter with the filter cake for enhancement thereof.

Figure 2:
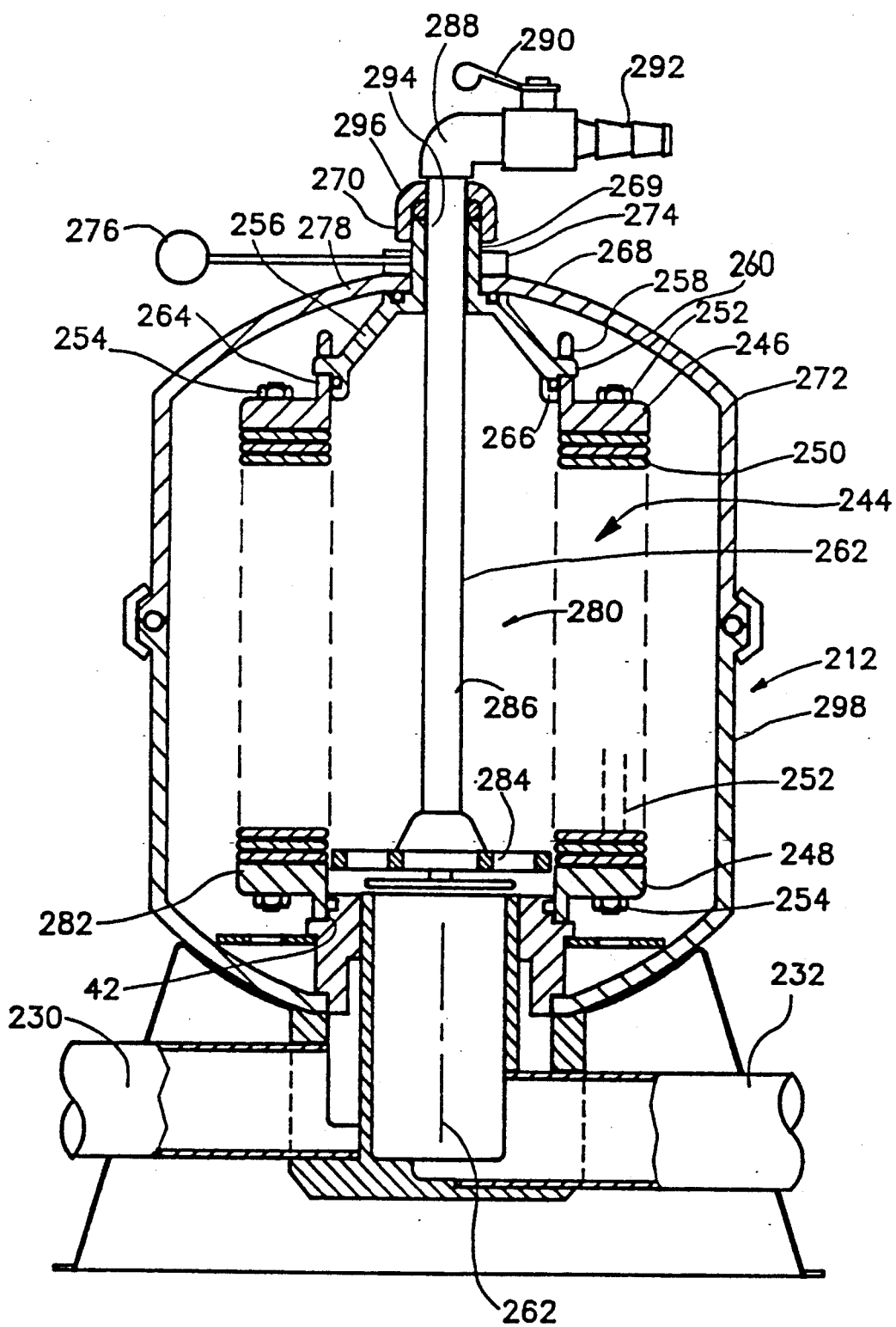
FIG. 2 is a side sectional illustration of a fluid filter constructed and operative in accordance with an embodiment of the present invention and including a handle for enabling rotation of the filter element and a backflushing nozzle.

Reference is now made to FIG. 2, which illustrates a fluid filter constructed and operative in accordance with a preferred embodiment of the present invention.

A filter element 244, such as a disc filter element of the type described in U.S. Pat. application Ser. No. 07/150,246, filed Jan. 29, 1988, with reference to FIGS. 1-9A of that application, the disclosure of which is incorporated herein by reference, is seated on and supported by support shoulder 42 (FIG. 1) defined by deflector collar member 218. It is particularly noted that support shoulder 42 provides a rotatable support for filter element 244, permitting rotation thereof relative to deflector collar member 218.

Filter element 244 is defined by top and bottom securing elements 246 and 248, which lie at respective top and bottom ends of a stack 250 of filter disks. The filter element 244 is held together tightly by a plurality of axial bolts 252 which are secured by suitable nuts 254 adjacent respective top and bottom securing elements. Filter disks are preferably of the type described in U.S. Pat. application No. 07/150,246, filed Jan. 29, 1988 with reference to FIGS. 1-9A of that application, the disclosure of which is incorporated herein by reference.

Bottom securing element 248 is seated onto shoulder 42, while top securing element 246 sealingly engages a rotatable mounting yoke 256, which supports and stabilizes the filter element 244 from above. The engagement between top securing element 246 and rotatable mounting yoke 256 includes the provision of axial protrusions 258 on top securing element 246, which engage radially extending protrusions 260 formed onto yoke 256, such that the rotation of yoke 256 about a central axis 262 produces rotation of top securing element 246 and thus of the entire filter element about axis 262. Yoke 256 also defines a shoulder 264 which locates top securing element 246 axially and a peripheral inner positioning surface 266, which locates the top securing element 246 radially with respect to axis 262. A sealing ring 268 is preferably associated with surface 266 for providing sealing between element 246 and yoke 256.

Rotatable yoke 256 is integrally formed with a neck portion 269, which extends upwardly through a central top aperture 270 formed in a top portion 272 of the filter housing. Rotatable yoke 256 is removably sealingly mounted onto top portion 272 by means of a collar member 274, which threadably engages neck portion 269 and which is formed with a handle 276. When collar member 274 is tightly threaded onto neck portion 269, an upper surface 278 of yoke 256 is disposed in rotatable sealing engagement with the top portion 272 of the filter housing about aperture 270, such that rotation of the handle in either direction produces corresponding rotation of yoke 256. Rotation of yoke 256 results in rotation of filter element 244 due to the interdigitation of protrusions 258 and 260 as described above A rotating backflush jet assembly 280 including a rotating nozzle 282, an apertured positioning element 284, a support and supply pipe 286, an angled top portion 288, a water supply valve 290 and a connector 292 to a flexible water supply hose not shown, is selectably slidably mounted about central axis 262 and extends through a bore 294 formed in yoke 256. Jet assembly 280 is selectably secured to neck portion 269 by means of a rubber ring seal which can be pressed inwardly to frictionally engage pipe 286 by tightening a cap screw 296 thereover in threaded engagement with neck portion 269.

The operation of the apparatus of FIG. 2 will now be summarized. Water to be filtered passes through the inlet and outlet assembly from the upstream side of the filter element 244 to the downstream side thereof and out through outlet pipe 232. Upon termination of the flow of water to be filtered into the filter, such as upon termination of the operation of a pump which produces the flow, an operator rotates handle 276 about axis 262 in either a continuous motion or a back and forth motion, thus causing rotation of the filter element 244 relative to the water contained therein. This relative rotation causes disengagement of filter aid material from the upstream surface of the filter element, such that such filter aid material falls to the bottom of the upstream volume of the filter, interior of a bottom portion 298 of filter housing 212.

Renewed supply of water to the filter via inlet pipe 230, the deflector and the distributor causes the filter aid material to be redistributed over the upstream surface of the filter element and thus be effectively regenerated, significantly extending its useful operating lifetime.

Figure 3:
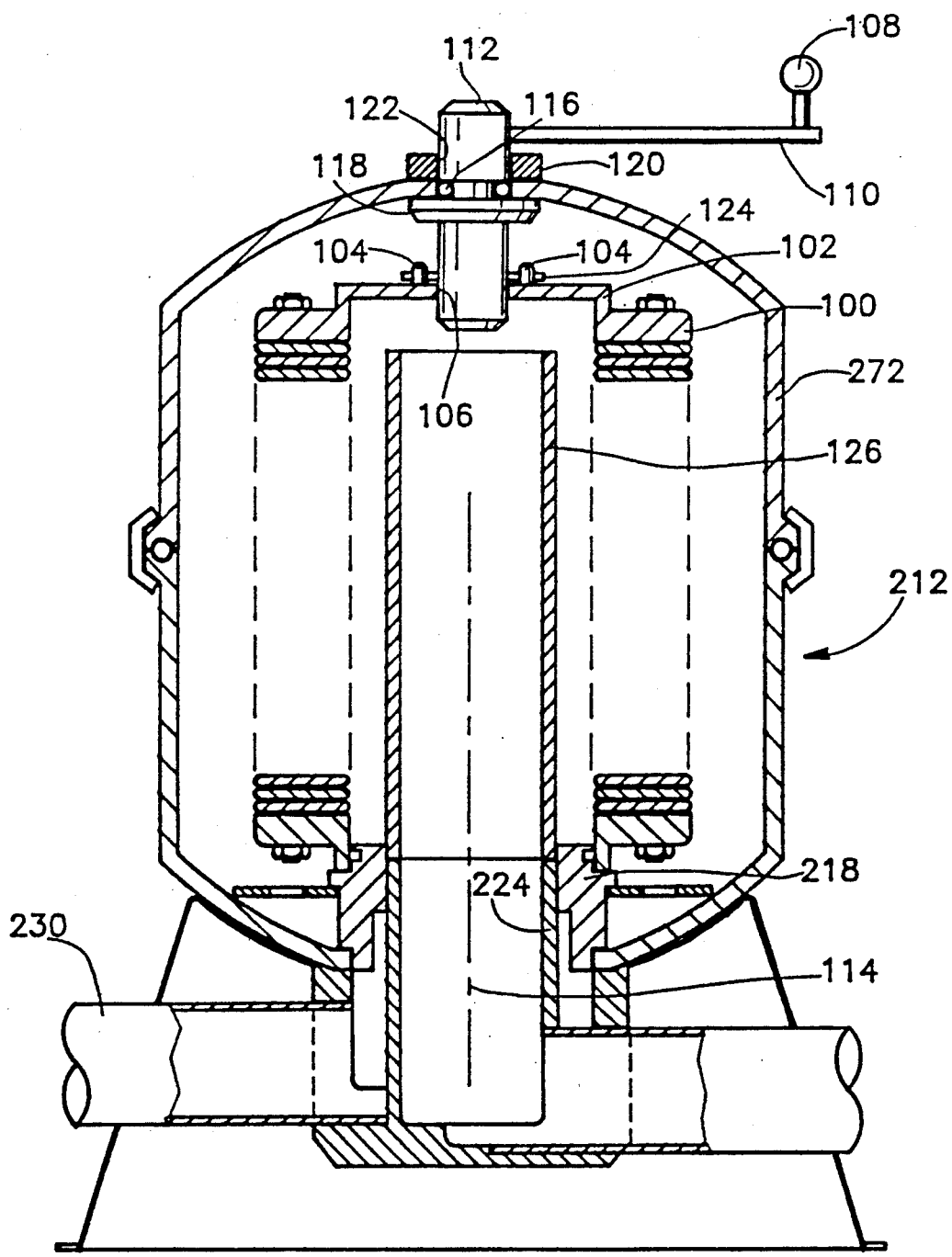
FIG. 3 is a side sectional illustration of a fluid filter constructed and operative in accordance with another embodiment of the present invention and including a handle for enabling rotation of the filter element and an elevated outlet conduit.

Reference is now made to FIG. 3, which shows an alternative embodiment of filter, which is similar to that of FIG. 2 but does not include a backflush nozzle assembly. Here, the inlet and outlet assembly may be identical to that of FIG. 2, as may be the filter element 244. In contrast to the embodiment of FIG. 2 here the top securing element 100 may be integrally formed with a rotatable yoke 102. Yoke 102 is preferably formed with a pair of spaced upstanding protrusions 104 disposed on either side of a central aperture 106.

A handle 108 is rotatably mounted via an arm 110 for rotation on an axle 112, which is arranged along a longitudinal axis 114 of the filter. Axle 112 sealingly and rotatably extends through a central aperture 116 formed about axis 114 in top cover portion 272 of the filter housing 212. Axle 112 is secured in position axially by means of an integrally formed bottom abutment member 118 disposed below top cover portion 272 and of a threaded nut 120, disposed above top cover portion 272. An O-ring 122 is disposed between the axle 112 and the top cover portion 272 to prevent escape of fluid from the filter housing.

Axle 112 extends downwardly and through central aperture 106 of yoke 102 in sealing engagement therewith. Extending transversely through axle 112 just above yoke 102 and in driving engagement with upstanding protrusions 104 is a drive member 124, which upon rotation of handle 108 and axle 112, produces rotation of the yoke 102 and thus of the filter element 244 about axis 114.

It will be noted that In the embodiment of FIG. 3, an upward continuation of the hollow shaft portion 224 is defined by the addition of a central outlet pipe 126 in the downstream region interior of the filter element 244 and axially centered about axis 114. Central outlet pipe 126 is theadably mounted at its bottom portion onto distributor collar member 218 so as to define an extension of the hollow shaft portion 224 and terminates just below the top of the filter element. This arrangement ensures that upon termination of the supply of water to inlet 230, the filter housing 212 will remain full of water up to the top of central outlet pipe 126.

Operation of the apparatus of FIG. 3 is identical to that of FIG. 2, with the exception that backflushing is not provided. Thus, when it is desired to remove the filter aid and Clean the filter element, the housing 212 must be opened and the filter element removed for backflushing as by the type of nozzle shown in FIG. 2.

Figure 4A:
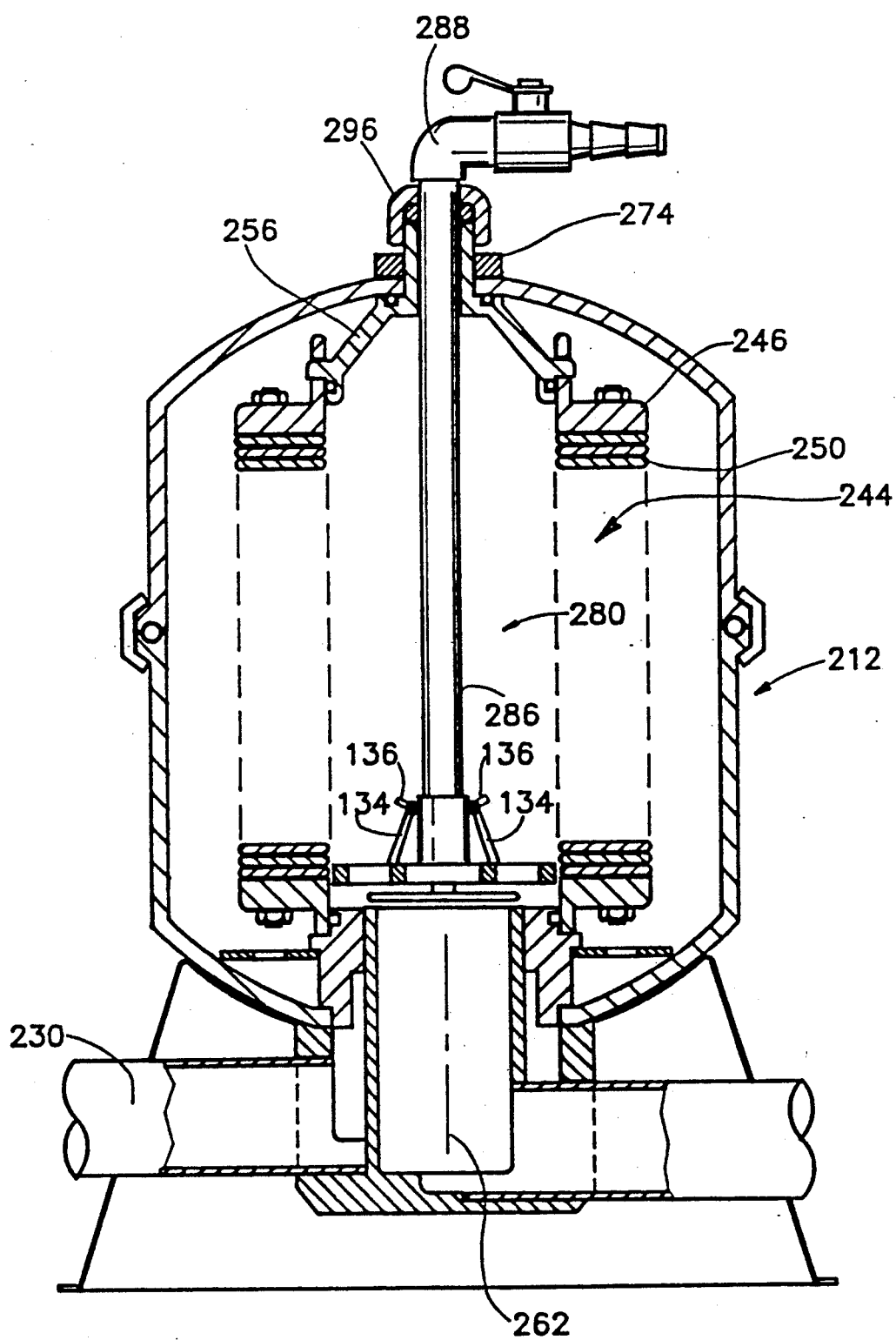
FIG. 4A is a side sectional illustration of a fluid filter constructed and operative in accordance with yet another embodiment of the present invention and including a foldable piston in a first operative orientation.
Figure 4B:
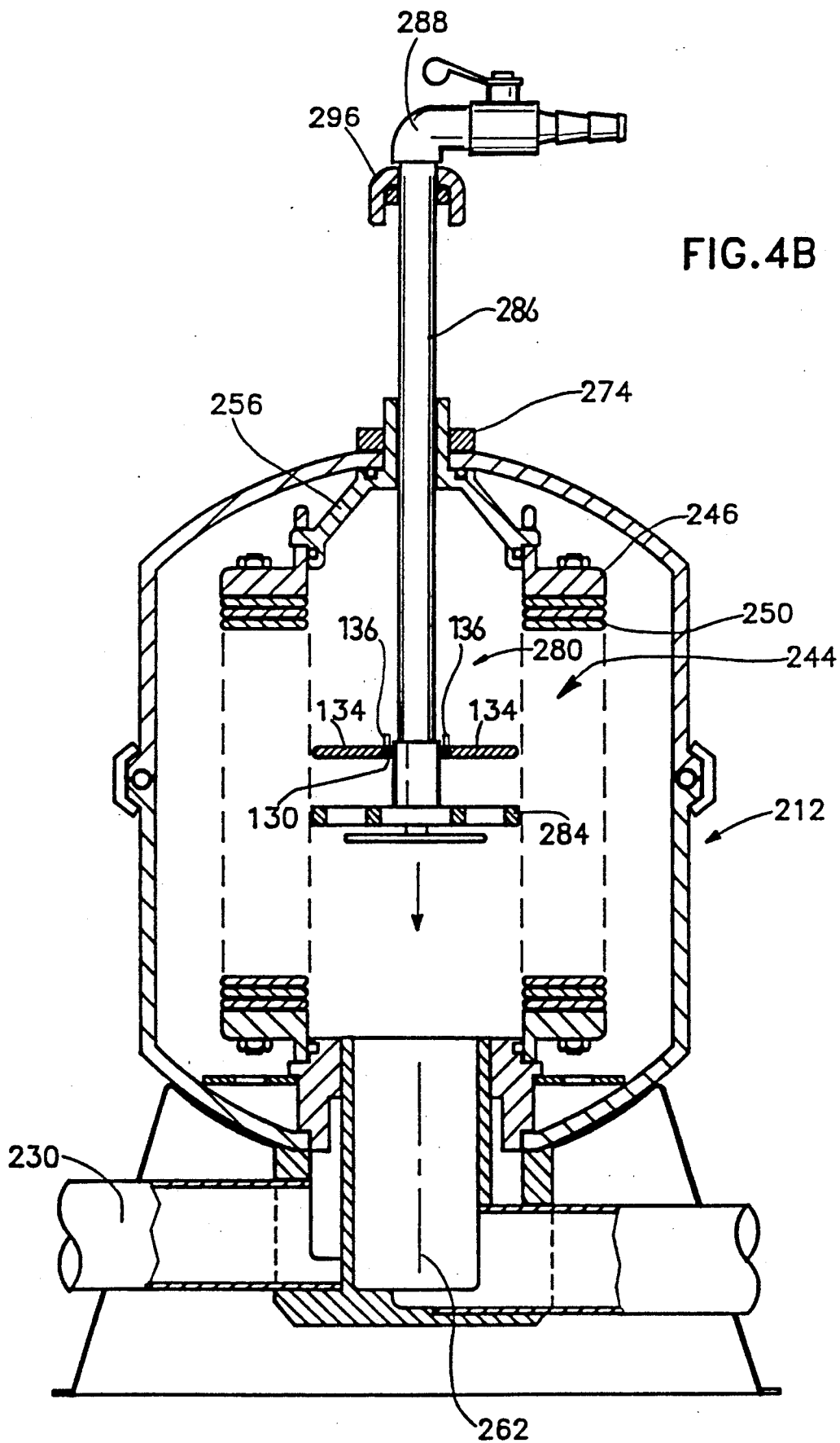
FIG. 4B is a side sectional illustration of the fluid filter of FIG. 4A in a second operative orientation.
Figure 4C:
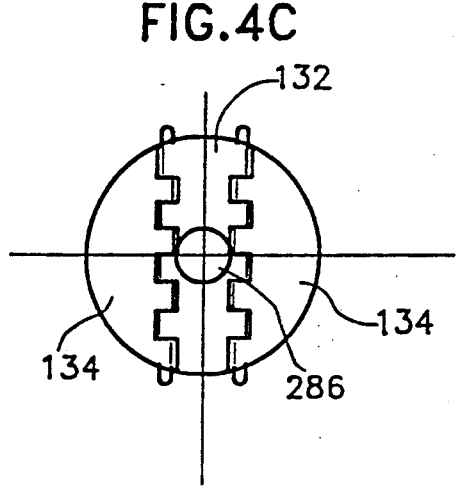
FIG. 4C is a plan view illustration of the foldable piston employed in the embodiment of FIGS. 4A and 4B.

Reference is now made to FIGS. 4A-4C, which illustrate yet another alternative embodiment of the present invention in first and second operative embodiments. The structure of the inlet and outlet assembly and of the filter element may be identical to that of the embodiment of FIG. 2, with the exception that the filter element and the yoke are fixedly mounted onto the filter housing, top portion, and not rotatable, no handle being provided.

The rotating jet backflush assembly 280 may be identical to that shown in FIG. 2. However a foldable piston assembly 130 (FIG. 4B) is preferably associated with pipe 286, just above apertured positioning element 284. A preferred structure of foldable piston assembly 130 is shown in FIG. 4C, where it is seen that the piston assembly 130 comprises a central portion 132, which is fixedly mounted onto pipe 286, and a pair of side portions 134, hinged onto opposite sides of central portion 132.

As seen in FIGS. 4A and 4B. there are associated with each of the pair of side portions 134, a retaining protrusion 136, which allows the side portion 134 to pivot downwardly but restricts the side portion to an approximate 90 degree orientation, when it is pivoted upwardly.

The operation of the apparatus of FIGS. 4A–4C will now be summarized. Upon termination of the supply of water to be filtered at inlet 230, cap nut 296 is unscrewed so as to permit the backflush assembly 280 to be raised and lowered along axis 262. FIG. 4A illustrates the orientation of the backflush assembly as it is being raised, wherein the piston assembly 130 is in its folded orientation. As seen in FIG. 4B which shows the piston assembly 130 as it is being lowered, the resistance of the water in the filter housing causes the piston assembly 130 to assume its extended orientation, such that downward movement of the piston assembly 130 causes water to be forced in a backflush direction through the filter element from the downstream side to the upstream side.

The forced movement of water due to the action of the piston assembly 130 causes filter aid material adhering to the upstream side of the filter element to disengage therefrom and fall to the bottom of the interior of the filter housing 212. It is appreciated that the disengagement of the filter aid material is produced even without the provision of a backflush spray through the backflush nozzle. In fact normally, the disengagement of the filter aid material from the filter element occurs when the backflush jet is not operated, it being noted that the provision of the piston assembly 130 does not interfere with normal backflushing operation of the backflush assembly 280.

The accumulated filter aid on the bottom of the housing is reoriented onto the upstream side of the filter element upon resupply of water to inlet 230, thus providing regeneration of the filter aid material.

Figure 5A:
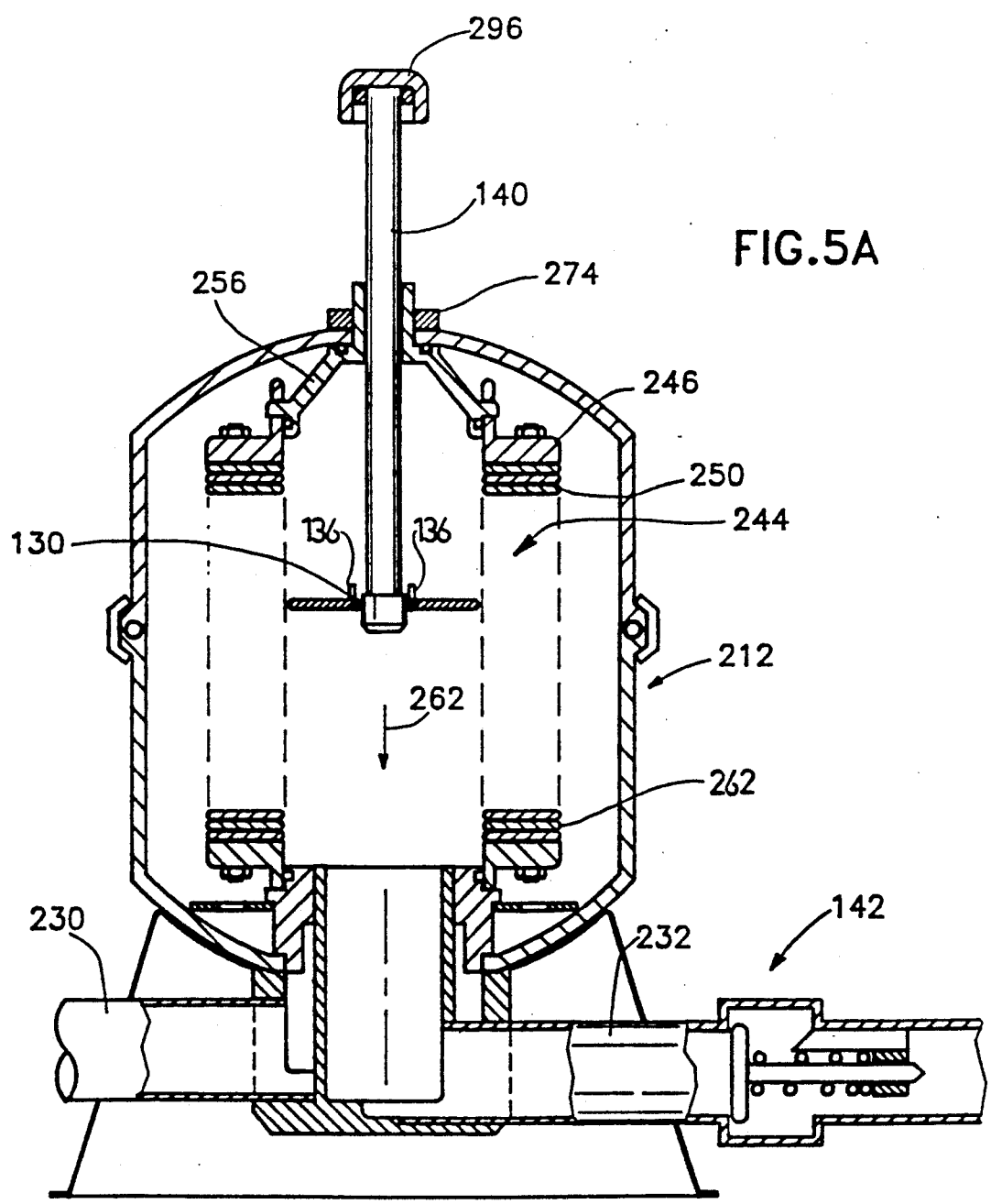
FIG. 5A is a side sectional illustration of a fluid filter similar to that of FIGS. 4A and 4B, including a pressure responsive valve, but without the backflush nozzle.

Reference is now made to FIG. 5A, which illustrates yet another embodiment of filter constructed and operative in accordance with a preferred embodiment of the present invention. This embodiment is identical to that of FIGS. 4A and 4B with the following exceptions: The backflush assembly 280 is here replaced by a simple rod 140 on which is mounted the foldable piston 130. Also, a conventional pressure maintaining valve 142 is associated with outlet pipe 232. The pressure maintaining valve 142 is operative to prevent outflow of water through the outlet pipe 232 except when water is being pumped into the inlet at least a predetermined pressure. When such pumping is terminated, valve 142 is closed, thus keeping the interior of the filter housing 212 full of water.

The valve 142 is configured and operative such that the downward piston action of piston assembly 130 does not cause opening of the valve. Accordingly, when the piston assembly 130 is moved downwardly along central axis 262, the flow of water through the filter element from the downstream side of the filter element to the upstream side thereof causes disengagement of filter aid material from the upstream side of the filter element such that that material falls to the bottom of the interior of the filter element. Subsequent resumption of the supply of water at inlet pipe 230 causes the filter aid material to readhere to the upstream side of the filter element in a different arrangement, thus completing the regeneration of the filter aid material.

Reference is now made to FIGS. 5B and 5C which illustrate still another embodiment of a filter constructed and operative in accordance with a preferred embodiment of the present invention. This embodiment is identical to that of FIG. 5A with the following exceptions: The valve 142 is not provided although alternatively it could be provided. Secondly, the structure of the foldable piston of the type shown in FIG. 4C is replaced by a pivotable piston assembly 150 as shown in FIG. 5C.

As seen in FIGS. 5B and 5C, the piston assembly 150 comprises a mounting collar 152, including a mounting protrusion 154 onto which is pivotably mounted a corresponding mounting protrusion 156 of a generally circular piston element 158, for rotation about a pivot axis 160, which lies perpendicular to axis 262. FIG. 5B illustrates the piston assembly 150 in an operative orientation during downward movement of rod 140 while FIG. 5C illustrates the piston assembly in a pivoted orientation, as during upward movement of the rod 140.

Reference is now made to FIGS. 6a-8, which illustrate an alternative embodiment of filter constructed and operative in accordance with the embodiment of the invention and including a combination cleaning unit and selectably operable piston.

Figure 6A:
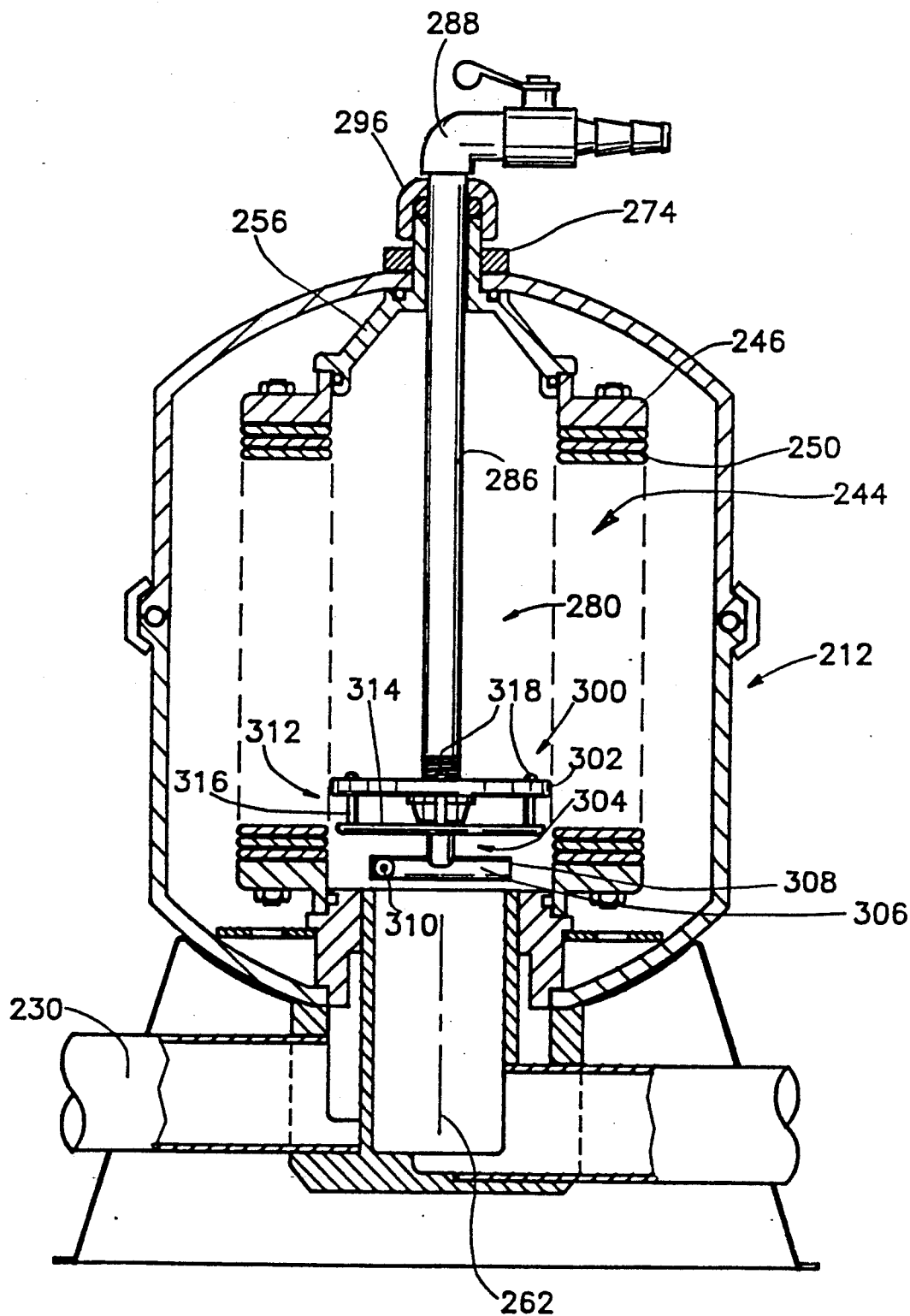
FIG. 6A is a side sectional illustration of a fluid filter constructed and operative in accordance with yet another embodiment of the present invention and including a combination cleaning unit and selectably operable piston in a first operative orientation.
Figure 6B:
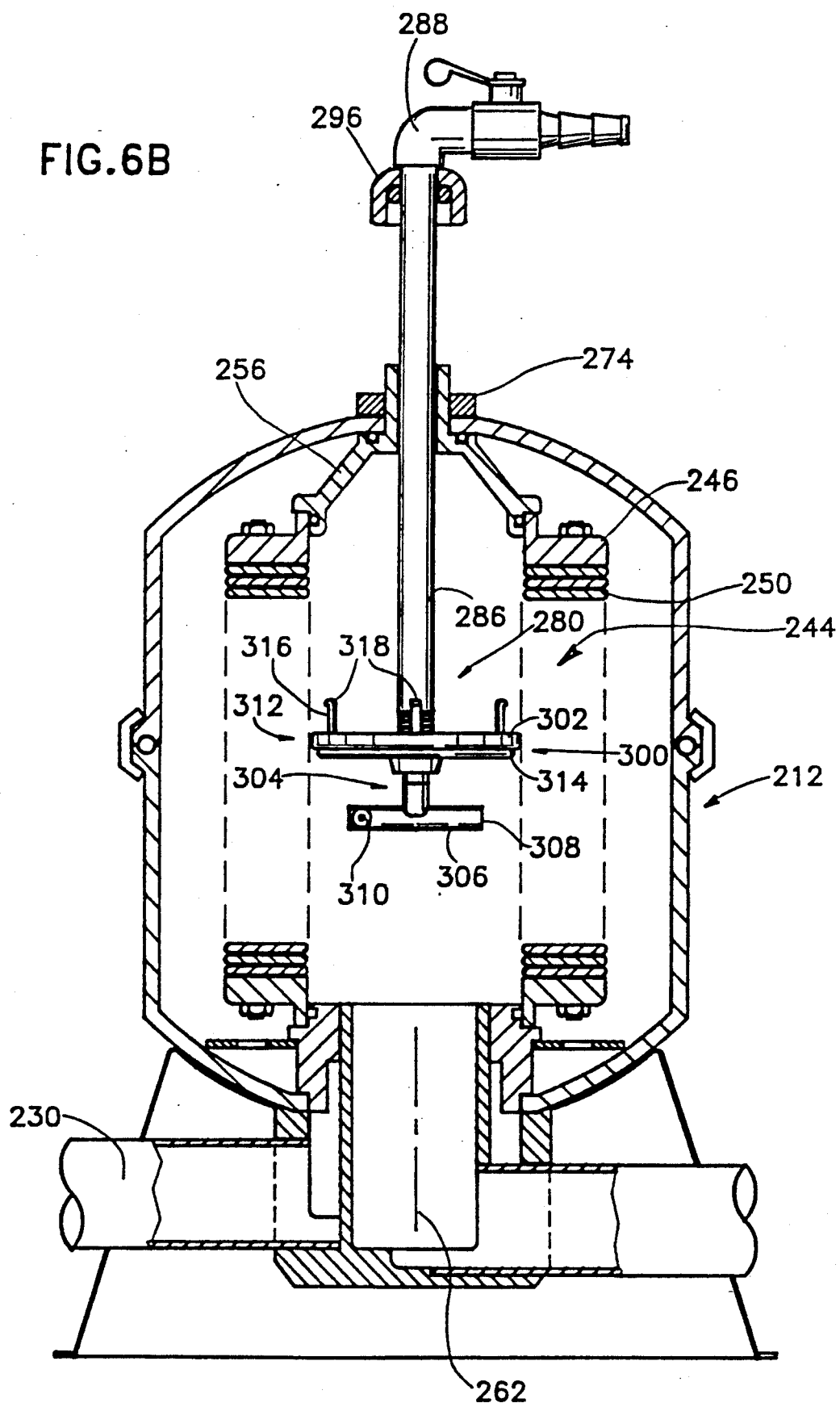
FIG. 6B is a side sectional illustration of the fluid filter of FIG. 6a in a second operative orientation.

This embodiment is identical to the embodiment of FIGS. 4A and 4B, except as described hereinbelow. Identical reference numerals will be used to designate identical elements. A combined rotating jet backflush unit and dislodging and reorienting unit assembly 300 is mounted onto pipe 286 as shown in FIGS. 6A and 6B. The combined rotating jet backflush unit and dislodging and reorienting unit assembly 300 comprises an apertured positioning element 302 threadably fixed onto pipe 286, and a rotating nozzle assembly 304, rotatably mounted onto pipe 286 at a location underlying the apertured positioning element 302.

Rotating nozzle assembly 304 comprises a main nozzle 306 having a radially directed outlet 308 and a relatively small side nozzle 310 providing sufficient reaction force to cause rotation of the nozzle assembly 304 about the axis of pipe 286.

Figure 7B:
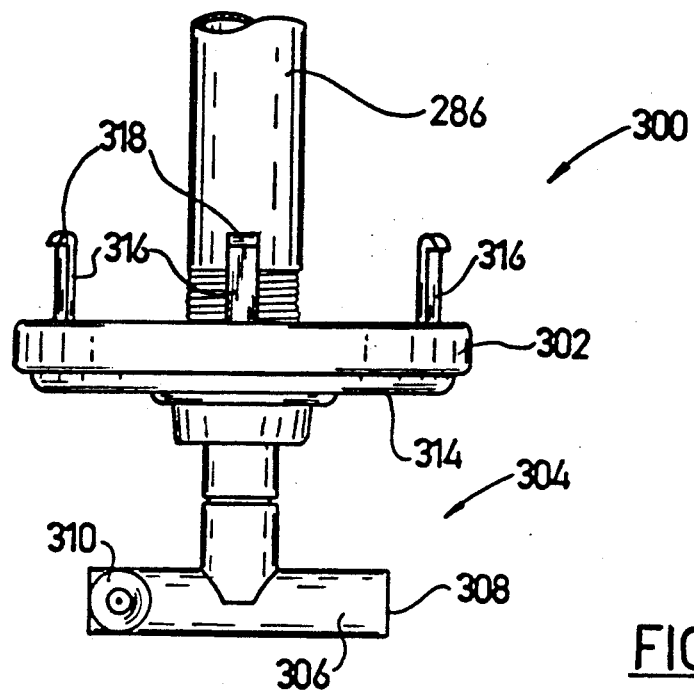
FIGS. 7A and 7B are side view illustrations of the combination cleaning unit and selectably operable piston of FIGS. 6A and 6B in respective first and second operative orientations.
Figure 7A:
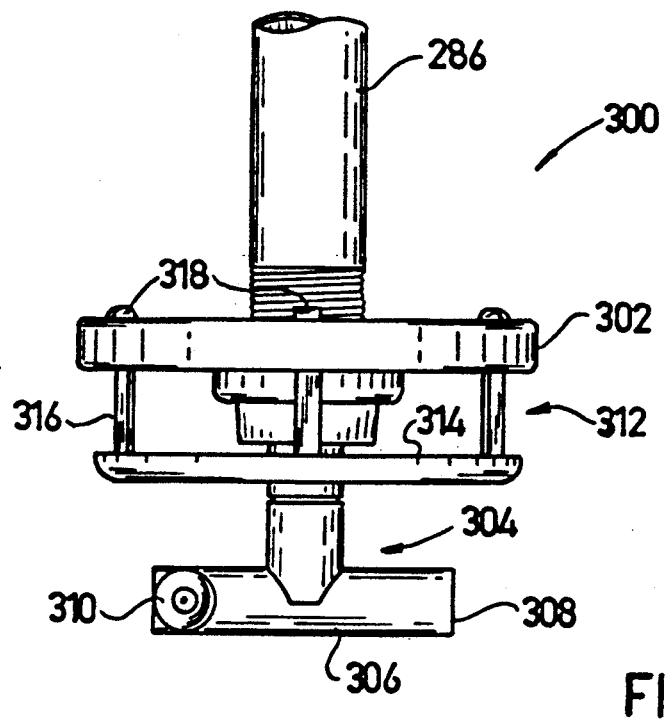
Figure 8:
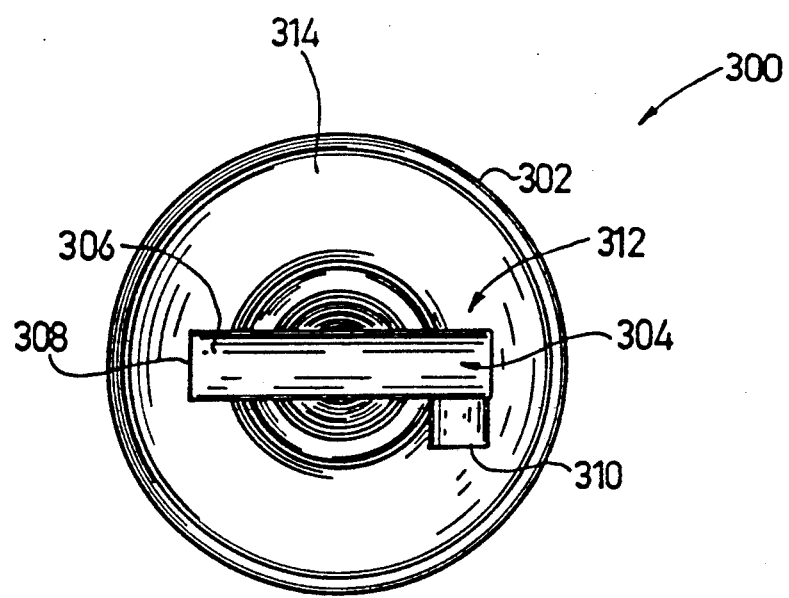
FIG. 8 is a bottom view illustration of the combination cleaning unit and selectably operable piston of FIGS. 7A and 7B.
Figure 9A:
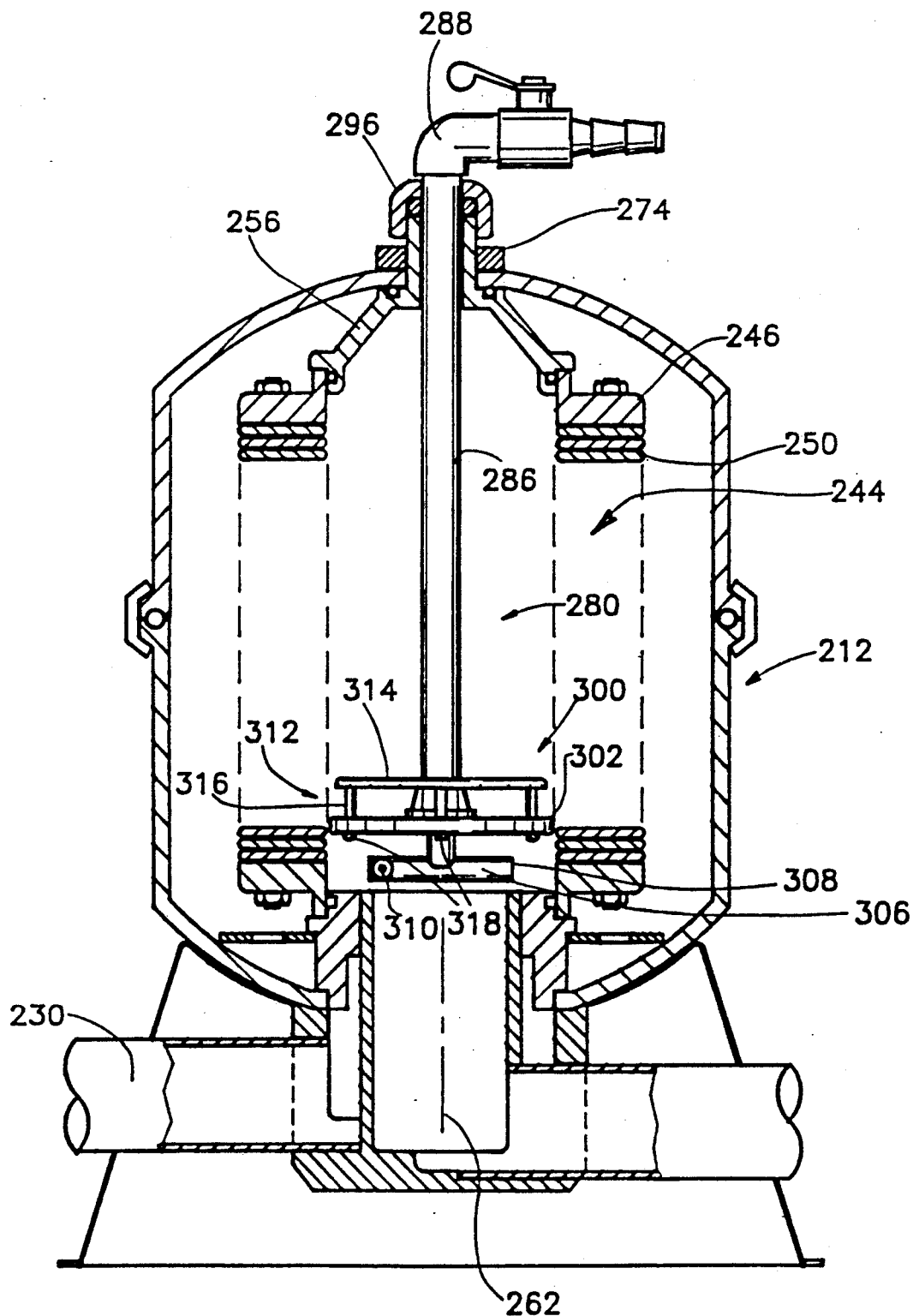
FIG. 9A is a side sectional illustration of a fluid filter constructed and operative in accordance with yet another embodiment of the present invention and including a combination cleaning unit and selectably operable piston in a first operative orientation.
Figure 9B:
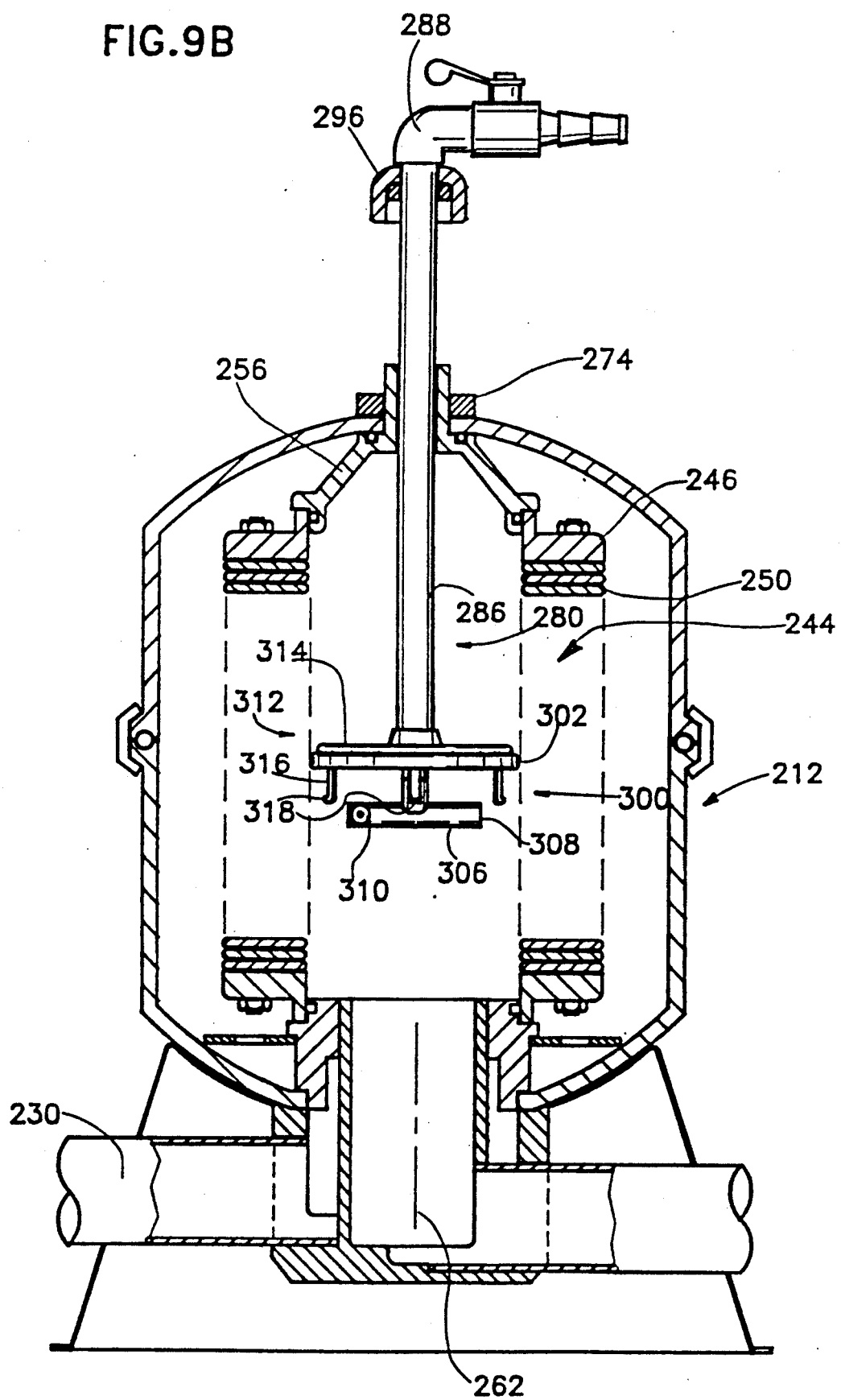
FIG. 9B is a side sectional illustration of the fluid filter of FIG. 9A in a second operative orientation.

Cooperating with apertured positioning element 302 is a slidable piston element 312 comprising an annular disk 314 and a plurality of upstanding engagement elements 316, which extend through apertures formed in apertured positioning element 302, as shown in FIGS. 7A and 7B. The engagement elements 316 terminate in radially extending protrusions 318, which retain piston element 312 against disengagement from positioning element 302.

Positioning element 302 and piston element 312 are configured such that when annular disk 314 lies in touching engagement with positioning element 302, as illustrated in FIG. 7A, a piston is defined, generally preventing liquid flow therepast. When annular disk 314 is spaced from positioning element 302, liquid passage past the assembly 300 is relatively unimpeded.

It may be appreciated that due to the liquid flow therepast as during filtration, the orientation of assembly 300 is generally as illustrated in FIG. 7A, permitting liquid passage therepast. However, if it is desired to employ assembly 300 as a dislodging and reorienting unit, downwards movement of pipe 286 against a body of liquid interior of the filter element will cause the assembly 300 to assume the orientation shown in FIG. 7B, and thus to function as a piston.

Reference is now made to FIGS. 9A, 9B, 10A and 10B which illustrate an alternative embodiment of filter similar in all relevant respects to that illustrated in FIGS. 6A-8, with the following exception: The orientation of apertured positioning element 302 and slidable piston element 312 along the longitudinal axis of pipe 286 is reversed.

Figure 10A:
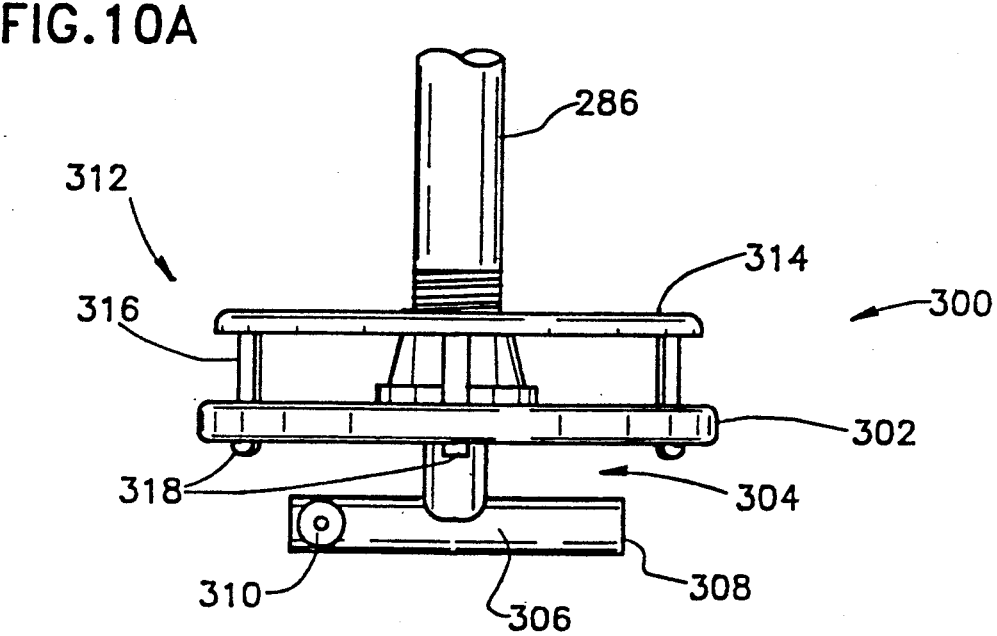
FIGS. 10A and 10B are side view illustrations of the combInation cleaning unit and selectably operable piston of FIGS. 9A and 9B in respective first and second operative orientations.
Figure 10B:
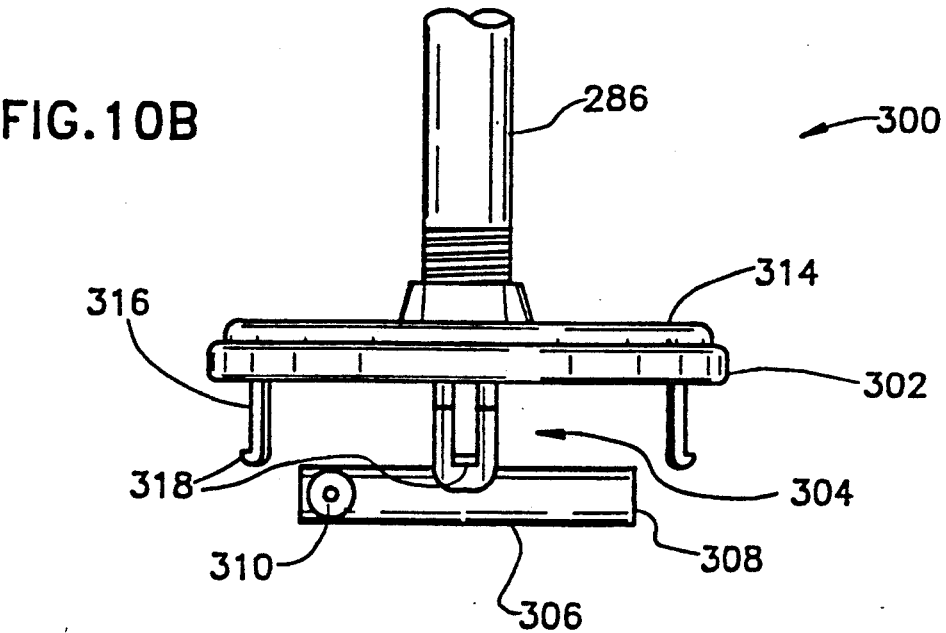

It may be appreciated that due to the liquid flow therepast as during filtration, the orientation of assembly 300 is generally as illustrated in FIG. 10A, permitting liquid passage therepast However, if it is desired to employ assembly 300 as a dislodging and reorienting unit, upward movement of pipe 286 against a body of liquid interior of the filter element will cause the assembly 300 to assume the orientation shown in FIG. 10B, and thus to function as a piston.

It will be appreciated by persons skilled in the art that the present invention is not limited by what has been particularly shown and described hereinabove. For example, all of the valves shown may be incorporated into a single valve. Rather the scope of the present invention is defined only by the claims which follow:

I claim:

1. A regeneration method for use with a fluid filter comprising a housing, a filter element disposed in the housing and arranged to receive a flow of fluid to be filtered from an upstream side of the element to a downstream side thereof, a fluid inlet communication with the interior of the housing and with the upstream side of the filter element, a fluid outlet communicating with the downstream side of the filter element, and piston apparatus disposed adjacent the downstream side of the filter element, said regeneration method comprising the step of operating the piston for producing circulation of fluid generally simultaneously from the downstream side of the filter element to the upstream side thereof and from the upstream side of the filter element to the downstream side thereof, thereby dislodging and reorienting particulate matter engaging the filter element and wherein a layer of filter aid material is positioned adjacent the filter element and forms part of the particulate matter which is dislodged and reoriented and wherein the regeneration method also comprises the step of removing fine particulate matter from the filter without removing filter aid material therefrom.

2. A regeneration method according to claim 1 and wherein said step of removing fine particulate matter comprises the steps of:

terminating pressurized flow of water to be filtered into the filter housing:
sealing the interior of the filter housing:
retaining water in the filter housing;
circulating water in the filter housing to dislodge filter aid material from the upstream side of the filter element;
renewing the pressurized flow of water to be filtered into the filter housing:
upon renewal of the pressurized flow of water into the filter housing and for a predetermined time, until the filter aid material is operational, coupling the water passing through the filter element and carrying fine particulate matter to the downstream side to a drain: and
upon the filter aid material being operational such that unacceptable quantities of fine particulate matter do not pass through the filter element, closing the drain and coupling the water passing through the filter element to the filtered water outlet.

3. A regeneration method for use with a fluid filter comprising a housing, a filter element disposed in the housing and arranged to receive a flow of fluid to be filtered from an upstream side of the element to a downstream side thereof, a fluid inlet communication with the interior of the housing and with the upstream side of the filter element, a fluid outlet communicating with the downstream side of the filter element, a layer of filter aid material positioned adjacent the upstream side of the element, and piston apparatus disposed adjacent the downstream side of the filter element, said regeneration method comprising the step of operating the piston for producing circulation of fluid generally simultaneously from the downstream side of the filter element to the upstream side thereof and from the upstream side of the filter element to the downstream side thereof, thereby dislodging and reorienting particulate matter engaging the filter element said regeneration method further comprising the step of removing fine particulate matter from the filter without removing filter aid material therefrom, and wherein said step of removing fine particulate matter comprises the steps of:

terminating pressurized flow of water to be filtered into the filter housing;
sealing the interior of the filter housing;
retaining water in the filter housing;
circulating water in the filter housing to dislodge filter aid material from the upstream side of the filter element;
renewing the pressurized flow of water to be filtered into the filter housing;
upon renewal of the pressurized flow of water into the filter housing and for a predetermined time, until the filter aid material is operational, coupling the water passing through the filter element and carrying fine particulate matter to the downstream side to a drain; and
upon the filter aid material being operational such that unacceptable quantities of fine particulate matter do not pass through the filter element, closing the drain and coupling the water passing through the filter element to the filtered water outlet.

* * * * *